(12) United States Patent
Hicks et al.

(10) Patent No.: US 6,401,319 B1
(45) Date of Patent: Jun. 11, 2002

(54) REAR SUSPENSION MOUNTING FEATURE AND METHOD

(75) Inventors: Timothy M. Hicks, West Bloomfield; Daniel E. Jennings, Birmingham, both of MI (US)

(73) Assignee: Oxford Suspension, Inc., Troy, MI (US)

( * ) Notice: Subject to any disclaimer, the term of this patent is extended or adjusted under 35 U.S.C. 154(b) by 0 days.

(21) Appl. No.: 09/595,586

(22) Filed: Jun. 15, 2000

Related U.S. Application Data (60) Provisional application No. 60/139,178, filed on Jun. 15, 1999.

(51) Int. Cl.[7] ................................................ B23Q 17/00
(52) U.S. Cl. ...................... 29/407.1; 29/407.09; 29/464; 269/900; 280/124.153
(58) Field of Search ........................ 29/897.2, 407.09, 29/407.1, 464, 525.02, 525.11, 559; 269/47, 900; 280/124.166, 124.128, 124.153

(56) References Cited

U.S. PATENT DOCUMENTS

| | | | | |
|---|---|---|---|---|
| 5,026,033 A | * | 6/1991 | Roxy | 269/900 |
| 5,107,599 A | * | 4/1992 | Marincic et al. | 269/900 |
| 5,829,151 A | * | 11/1998 | Collier et al. | 33/549 |
| 5,862,583 A | * | 1/1999 | Ammann et al. | 29/464 |

FOREIGN PATENT DOCUMENTS

| | | | | |
|---|---|---|---|---|
| JP | 363008082 | * | 1/1988 | 29/464 |
| JP | 405253770 A | * | 10/1993 | 29/897.2 |

* cited by examiner

*Primary Examiner*—S. Thomas Hughes
*Assistant Examiner*—Jermie E. Cozart
(74) *Attorney, Agent, or Firm*—Dykema Gossett PLLC (57) ABSTRACT

A method of marrying a rear axle assembly to a vehicle body is provided. The axle assembly includes parallel-spaced trailing control arms connected together by a transverse twist beam. The trailing control arms have a sleeve at a forward end and a spindle plate adjacent a rear end. The spindle plate along its lower end having V-shaped notches which are vertically and fore and aft aligned with one another. The axle assembly is connected with a tool tray, having two fore and aft aligned and vertically aligned elevated first and second pins projecting toward one another and third and fourth pins for contacting said trailing control arm sleeves to set the vertical height of the forward end of the trailing control arms. The axle assembly is set on the tray by placing the spindle plate V-shaped notches on the first and second pins to set the axle assembly fore and aft position and rear end vertical position with respect to the tray. The sleeves of the trailing control arms are set on the third and fourth pins to set the height of the fore end of the trailing control arms. The tool tray is lifted up to the vehicle body and the axle assembly is connected to the vehicle body.

7 Claims, 7 Drawing Sheets

REAR SUSPENSION MOUNTING FEATURE AND METHOD

This application claims the benefit of U.S. provisional application Ser. No. 60/139,178, filed Jun. 15, 1999.

FIELD OF THE INVENTION

The field of the present invention is rear suspensions for motor vehicles. More particularly, the invention relates to features of rear suspensions which facilitate the installation (marriage) of a rear axle assembly onto a vehicle body in a properly aligned condition. This invention also relates to the methods which are used to install a rear axle assembly onto a vehicle body.

BACKGROUND OF THE INVENTION

One type of rear axle assembly commonly used in front wheel drive vehicles is a twist axle. Twist axles are mounted to the underbody of a vehicle at a pair of pivot points defined by bushings. The bushings are typically disposed at an end of axle trailing control arms. The axle trailing control arms typically extend rearward from the bushings. The bushings define an axle pivot axis about which the axle assembly pivots after being mounted on the vehicle. The bushings are typically formed in three primary parts: a generally donut-shaped isolator portion formed of elastomeric material; a cylindrical inner sleeve disposed within and bonded to the isolator; and a cylindrical outer sleeve disposed over and bonded to the isolator. The bushings help to dampen axle impact loads, particularly fore/aft impact loads. The bushings can have different spring rates in each fore/aft direction, the vertical direction and the lateral direction. A transverse beam connects the trailing control arms to form an H-shaped structure. Spring seats are commonly provided on the axle assembly trailing control arms to support suspension coil springs disposed between the body and the axle. Shock absorbers having one end attached to the trailing control arms and a second end attached to the body are also provided. Depending on the structure of the trailing control arms, a transversely-oriented track bar may or may not be placed between the axle assembly and the body to laterally stabilize the axle assembly. Depending on the desired torsional stiffness of the axle assembly, the axle assembly may or may not have a transversely-extending stabilizer bar disposed within or in close proximity to the transverse beam. The stabilizer bar, if utilized, can be of a desired torsional stiffness established by vehicle design criteria.

Each side of the axle assembly has a spindle mounting plate towards a rear end of the respective trailing control arm. The spindle mounting plates may form part of the spring seats. The spindle mounting plates can also be located elsewhere, such as at the extreme ends of the transverse beam, separate from the spring seats. Spindle assemblies, which include wheel bearings, and spindles are mounted to the spindle plates. The spindles rotate relative to the spindle plates. Rotating brake elements, such as brake drums or brake discs, are in turn mounted to the spindles. The wheels are also mounted to the spindles, over the brakes. Because the wheels are mounted, albeit indirectly, to the spindle plates, the spindle plates must be made parallel to each other to facilitate wheel alignment. Also, features on the spindle plates which locate the spindle assemblies thereon must be aligned so that, when mounted, the spindles are axially aligned with each other. The location of the axis of alignment between the spindles is preferentially parallel to the pivot axis of the axle assembly as defined by the sleeves of the bushings, so as to aid in ensuring wheel alignment.

It should be readily apparent that it is critical to align the axle in general and the spindle plates in particular, with the vehicle body to ensure correct wheel alignment. Correct location of the spindle plates relative to the body can help compensate for small errors in locations of the bushings relative to the spindle plates, and in small errors in the locations of the mounting features for the bushings on the body. The axle assembly is fixed relative to the body in a fore/aft location by the fixing of the bushings to the body. The bushings are clamped into place.

Intermediate brackets may be used to connect the bushings to the body. Such brackets provide further opportunity for misalignment. The brackets have side walls (commonly referred to as ears) which define lateral or transverse gaps receiving the axle bushings. The bracket side walls have apertures receiving mounting bolts. The shank of the mounting bolt passes through the aperture and the sleeve of each bushing. The bolt is torqued to clamp the bracket against the sleeve to prevent its rotation. Relative rotation between the axle assembly and the vehicle body is absorbed by the elastomeric isolators.

Typically, in known systems, different locating features are used to locate or position the axle relative to the vehicle body. Separate features, commonly referred to as locator points, are used to position the axle assembly in the fore/aft direction with respect to the vehicle body. Other features on the axle assembly are used to position the axle assembly in the vertical direction. And still other features are used in the lateral direction on each side of the axle assembly to locate each side of the axle to a desired vertical position. It is therefore desirable to commonize the features which locate the axle assembly to the vehicle body.

SUMMARY OF THE INVENTION

To make manifest the above-delineated and other desires, the revelation of the present invention is brought forth.

The axle assembly positioning system of the present invention relies on the V notches in the spindle plates as a single feature which provides both a desired fore/aft location or alignment and a desired vertical location or alignment of the spindle plates with respect to a supporting tool tray.

Prior to mounting in the vehicle, the axle module is placed on a supporting tool tray. The tool tray is aligned with the overhead vehicle body. The tool tray has a vertical pin or pins which are aligned with body gauge holes that are penetrated into the rail of the vehicle body forward of the rear wheel wells to insure that the tool tray is aligned with the vehicle body in a fore/aft position and in a lateral position. The tool tray has a plurality of features disposed thereon which engage and support the axle in a desired position. The tool tray (which is a part of a conveyor system) is maintained in fixed fore/aft and lateral positions with respect to the vehicle body during the marriage process. The tool tray additionally has a pair of axle assembly alignment pins axially aligned on an alignment pin axis of a predetermined diameter which engage the V notches in the spindle plates. In one embodiment of the present invention, the diameter of the alignment pins is ⅝ inch. The alignment pins are tangentially engaged by the sides of the spindle plate V notches. The pins position the spindle plates, and thus, the spindles, at a predetermined distance from an upper surface of the tool tray. The tangential engagement of the axle assembly alignment pins with the V notches of the spindle plates also results in positioning the axle assembly at a predetermined fore/aft location relative to the tool tray. The axle assembly alignment pins are axially aligned along an alignment pin axis. The axle assembly alignment pins are held in position relative to the tool tray by support pins (or stands) welded to both the alignment pins and the tool tray. Other locating pins are also provided on the tool tray. A forward pin engages each bushing retention sleeve at approximately the center of the sleeve. The forward pin is of a relatively small diameter to ensure that the pin contacts the sleeve, and not part of the arm. The length of the forward pin relative to the distance of the alignment pin above the tool tray controls the angle of the axle trailing control arms relative to the tool tray. There is also two pair of lateral locating pins. These laterally entrap each trailing control arm of the axle assembly to ensure alignment of the bushings with the brackets.

In the marriage process, the body and the axle assembly are brought together while the axle assembly remains supported by the tool tray. With the position of the axle assembly controlled by the tool tray and the locating pins, the axle assembly is lifted to the desired position relative to the body. The mounting bolts are passed through the apertures in the brackets, through the sleeves and torqued to a predetermined magnitude of torque to clamp the sleeves into place. Once the axle assembly is mounted into place, the tool tray is dropped away from the axle and the body. The axle assembly is connected with the body in a proper fore/aft and lateral aligned position, as well as in a proper "curb" vertical position due to the V notch tangential contact with the axle assembly alignment pins.

Other features and desires of the present invention can be discovered by a review of the accompanying drawings and detailed description of preferred embodiments.

DETAILED DESCRIPTION OF THE PREFERRED EMBODIMENTS

Figure 10:
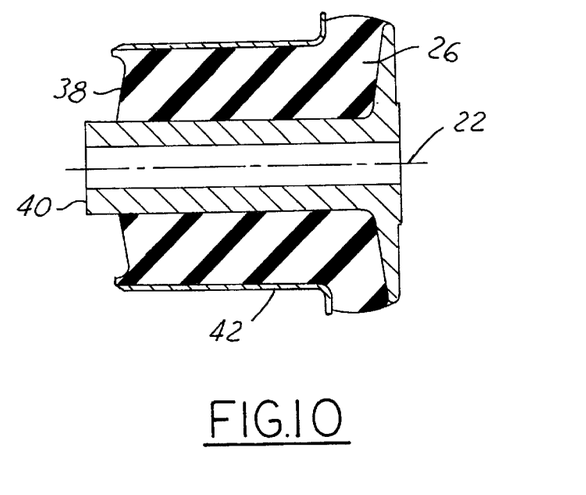
FIG. 10 is an enlarged sectional view of a bushing which is inserted into a sleeve of the axle assembly shown in FIG. 1.

Referring to FIGS. 1–10, one type of axle assembly commonly used in the rear of front wheel drive vehicles is a twist axle 7. Axle assembly 7 is mounted to the underbody 14 of a vehicle 18 at a pair of pivot points defined by an axis 22 of bushings 26 (FIG. 10). The bushings 26 are typically disposed at forward ends 30 of trailing control arms 34. Trailing control arms 34 extend rearwardly from the bushings 26. As previously mentioned, the axis 22 of the bushings 26 defines the pivot point of the axle assembly 7 after it has been mounted to vehicle 18. Bushings 26 are typically formed in three primary parts. The first part is a generally donut-shaped isolator portion 38 formed of an elastomeric material. A flanged cylindrical inner sleeve 40 is disposed within the isolator 38 and is bonded thereto. A cylindrical outer sleeve 42 is disposed over and bonded to the isolator 38. Bushings 26 aid in dampening axle impact loads, particularly fore/aft impact loads. Bushings 26. can have different spring rates in each of the fore/aft direction, the vertical direction and the lateral direction.

Figure 11:
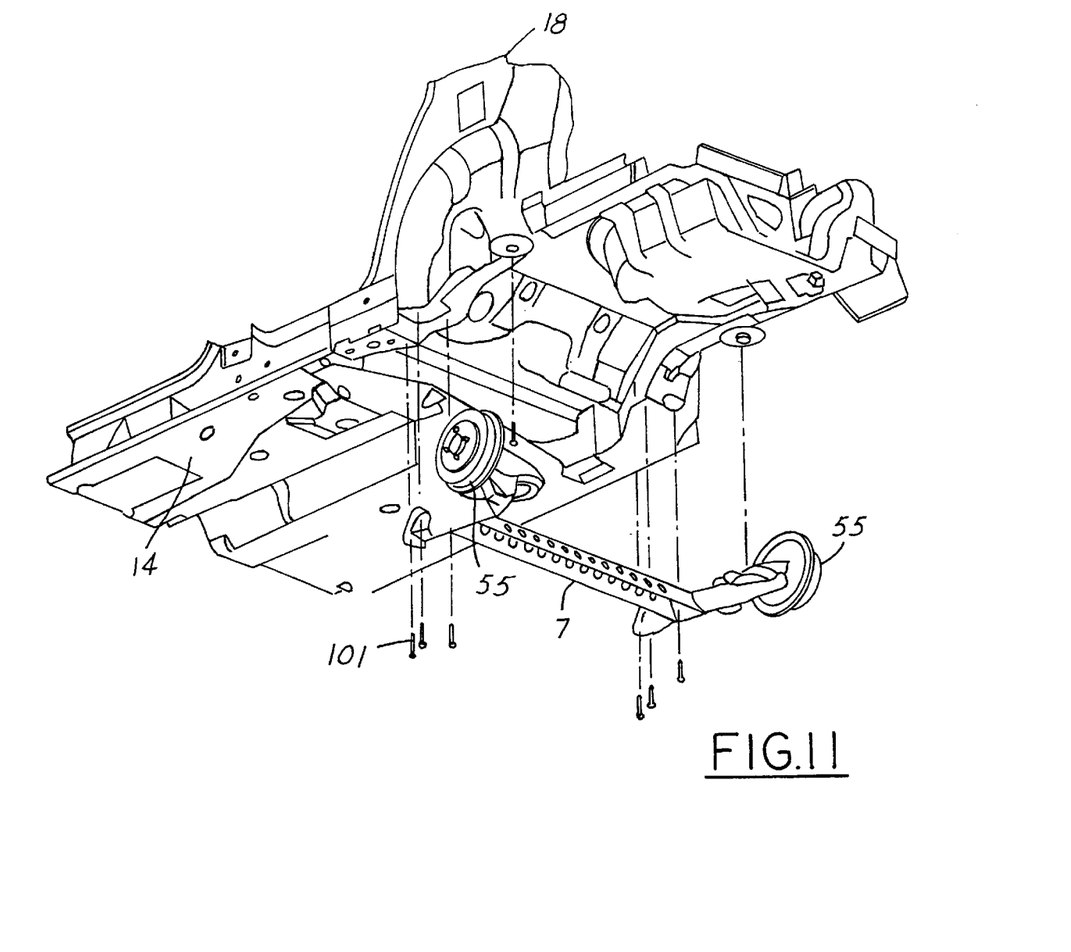
FIG. 11 is a perspective view with the tool tray removed for clarity of illustration, showing the positioning of the axle assembly underneath the vehicle body during the marriage process illustrating the underside of the vehicle body.

An inverted U-shaped transverse beam 45 fixably connects the two parallel-spaced trailing control arms 34. Towards its rear end, each trailing control arm 34 has a spring seat 48. The spring seats 48 are commonly provided on the axle assembly 7 to support the suspension coil springs 49 (FIG. 12) disposed between the vehicle body 18 and the axle assembly 7. Shock absorbers (not shown) having one end attached to the axle assembly 7 and a second end attached to the vehicle body 18 extend generally along the axis of the coil springs 49. Depending upon the structure of the trailing control arms 34, a transversely-oriented track bar (not shown) may or may not be placed between the axle assembly 7 and the vehicle body 18 to laterally stabilize the axle assembly 7. Depending upon the desired torsional stiffness of axle assembly 7, the axle assembly may or may not have a torsionally-extending stabilizer bar extending within or in close proximity to the transverse beam 45. The stabilizer bar, if employed, can be of a desired torsional stiffness established by vehicle design criteria. Towards a mid or rear end of the trailing control arms 34 on their outboard side, there is a spindle mounting plate 51. In the axle assembly 7 the spindle mounting plate 51 is formed continuous with the spring seat 48. However, in alternative embodiments the spindle mounting plates 51 can be separate from the spring seats. A spindle assembly which includes a spindle is connected to the spindle plate 51. The spindle assembly also includes the wheel bearings. The spindle rotates relative to the spindle plate 51. Rotating brake elements, such as brake drums 55 (FIG. 11) or brake discs are in turn mounted to the spindles. The vehicle wheels (not shown) are also mounted to the spindles over the brake drums 55. Because the wheels are mounted, albeit indirectly, to the spindle plates 51, the spindle plates must be made parallel to each other to facilitate wheel alignment. Also, features of the spindle plates which locate the spindle assemblies thereon must be aligned so that when mounted the spindles are axially aligned with each other. The location of the axis of alignment between the spindles is preferentially parallel to the pivot axis of the axle assembly as defined by the sleeves of the bushings 26 (which is typically coterminous with axis 22 of the bushing), so as to aid in ensuring proper wheel alignment. The inventive axle assembly 7 spindle plate 51 has a V-shaped notch 58 in a lower side of the spindle plates. The V-shaped notch 58 in the spindle plates is beneficial in achieving a desired axle assembly 7 to vehicle body 14 alignment.

It should be readily apparent that it is critical to align the axle assembly 7 in general and the spindle plates 51 in particular, with the vehicle body 14 to ensure correct wheel alignment. Correct location of the spindle plates 51 relative to the vehicle body 14 can help compensate for small errors in location of the bushings 26 relative to the spindle plates 51, and for small errors in location of the mounting features for the bushings 26 to the body. The bushings 26 are clamped into place in connection to the vehicle body 7 using brackets 70 (best shown in FIGS. 8, 14–17).

Each forward end of the trailing control arms has transversely weldably connected thereto a tubular or cylindrical sleeve 73. The sleeve 73 has press-fitted therein the bushing 26. The bracket 70 is a sheet metal stamped piece and has two arms 74 with inboard ears or sidewalls 77. Sidewalls 77 define a gap therebetween for receipt of the bushings 26. A mounting bolt and associated nut is used to connect the bushings 26 to the bracket sidewalls 77. Accordingly, the vehicle body 14 which is affixed to bracket 70 is fixably connected to bushings 26 via cylindrical inner sleeves 40 via a threaded fastener or bolt (not shown).

Figure 12:
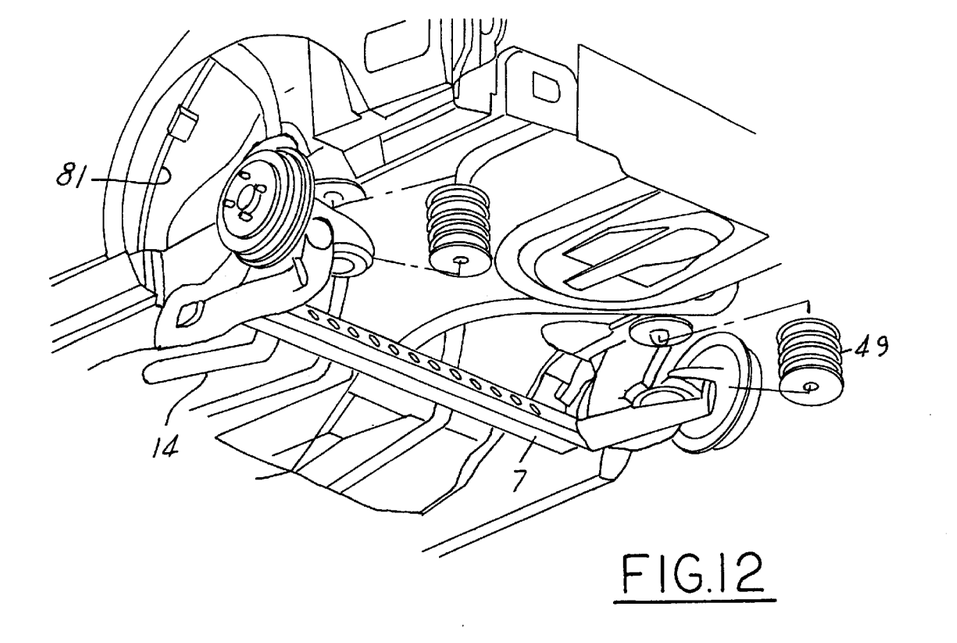
FIG. 12 is a perspective view similar to that of FIG. 11, illustrating connection of the axle assembly to the vehicle body and placement of the coil springs of the suspension.
Figure 13:
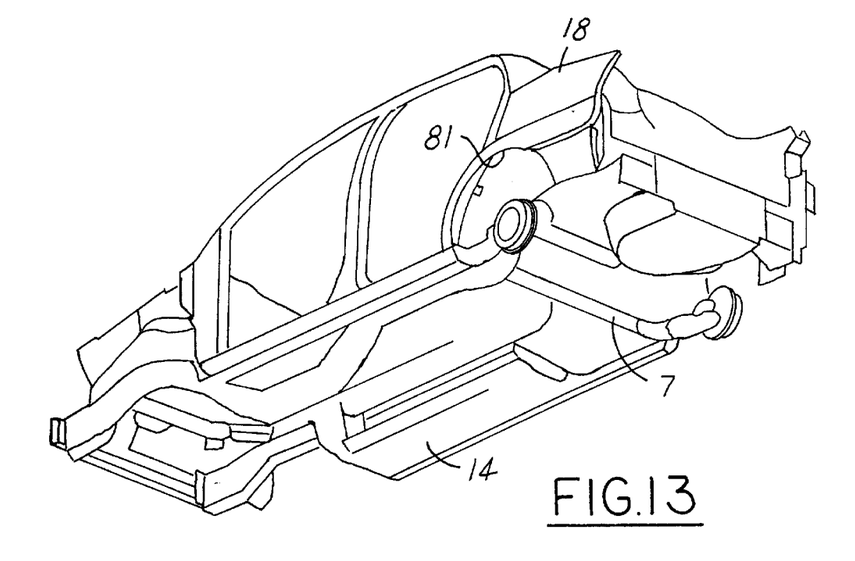
FIG. 13 is a reduced perspective view similar to that of FIG. 12, illustrating the axle assembly and the vehicle body as shown in FIG. 12.
Figure 14:
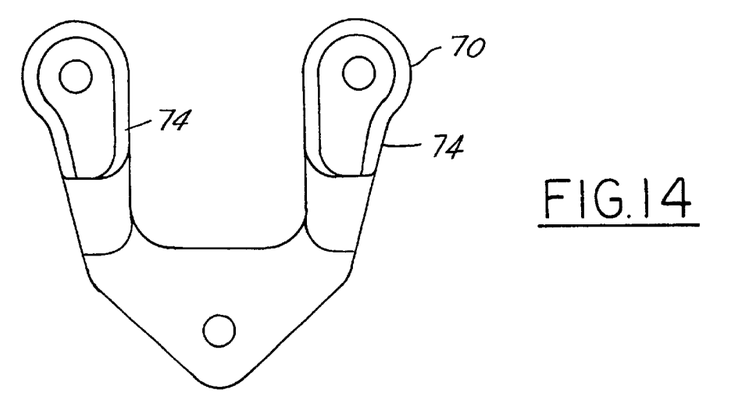
FIGS. 14–17 are plane, front elevational, side elevational and perspective views of the bracket shown in FIG. 8 detached from the bushing and sleeve of the axle assembly.
Figure 15:
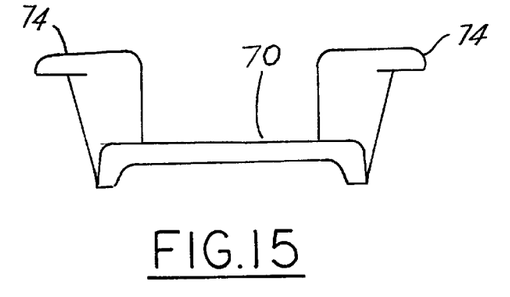
Figure 16:
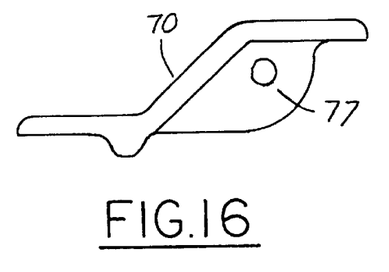
Figure 17:
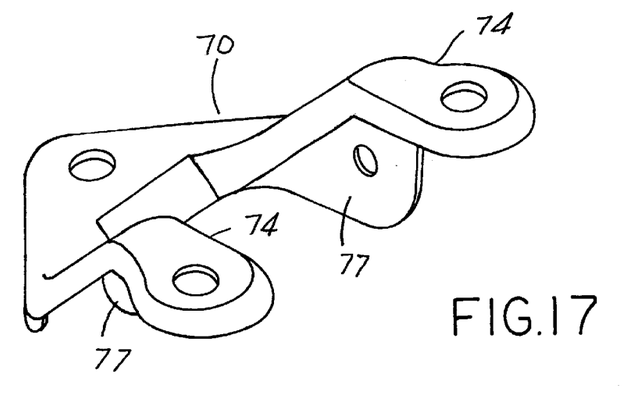

During vehicle production, an axle module including the axle assembly 7 and various brake components are attached to the vehicle body 14 in part of the vehicle marriage process. The axle assembly 7 is first placed upon the tool tray 80. The tool tray 80 comprises part of the conveyor system (not shown) and is maintained in a fixed and fore/aft lateral alignment with respect to the vehicle body 14 during the marriage process. The tool tray may have a pair of vehicle alignment pins (not shown) which are laterally and fore/aft aligned with vehicle body alignment datem holes on the side rails of the vehicle body 14 slightly forward of the rear wheel wells 81 (FIG. 12). The tool tray 80 has a plurality of features disposed thereon which engage and support the axle assembly 7 in a desired position. As shown in FIGS. 1, 4, 5, 8 and 9, the spindle assemblies and connected brake components have been removed for clarity of illustration. The tool tray has a pair of alignment pins 87 which are axially aligned on an alignment pin axis of a predetermined diameter which engages V-shaped notches 58 in the spindle plates 51 of the axle assembly 7. The alignment pins 87 project inwardly toward one another and are fore/aft and vertically aligned. The alignment pins 87 are also elevated and are supported on support posts 91. The alignment pins 87 position the axle assembly 7 along the rear end of the axle assembly at a predetermined fore/aft location relative to the tool tray 80. A forward pin 93 engages each of the bushing retention sleeves 73 at approximately the center of the sleeves. The forward pin 93 is of a relatively small diameter to ensure that the pin 93 contacts the sleeve 73 and not part of the trailing control arm 34. The length of the forward pin 93 relative to the distance of the alignment pin 83 above the tool tray 80 controls the angle of the trailing control arms 34 relative to the tool tray 80. This is also a factor in determining the curb height of the vehicle when the axle assembly 7 is connected thereto and the suspension system is fully installed, including the coil springs 49 and shock absorbers. There is also provided two pair of laterally locating pins 97. Pins 97 laterally entrap each trailing control arm 34 to ensure alignment of the bushings 26 within the brackets.

In the marriage process, the vehicle body 14 and axle assembly 7 are brought together while the axle remains supported by the tool tray 80. When the position of the axle assembly 7 controlled by the tool tray 80 and the locating pins 87, 93, 97, the axle assembly 7 is lifted to the desired position relative to the vehicle body 14. (In FIG. 11, the tray 80 has been removed for clarity of illustration.)

Figure 8:
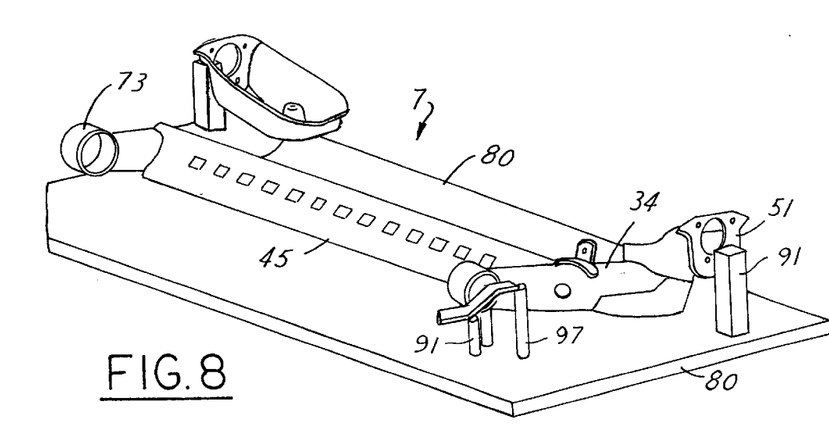
FIG. 8 is a view similar to the aforedescribed views of FIGS. 4–6, illustrating placement of the axle on the tool tray with a bracket that is preattached to a bushing preconnected to the axle assembly.
Figure 9:
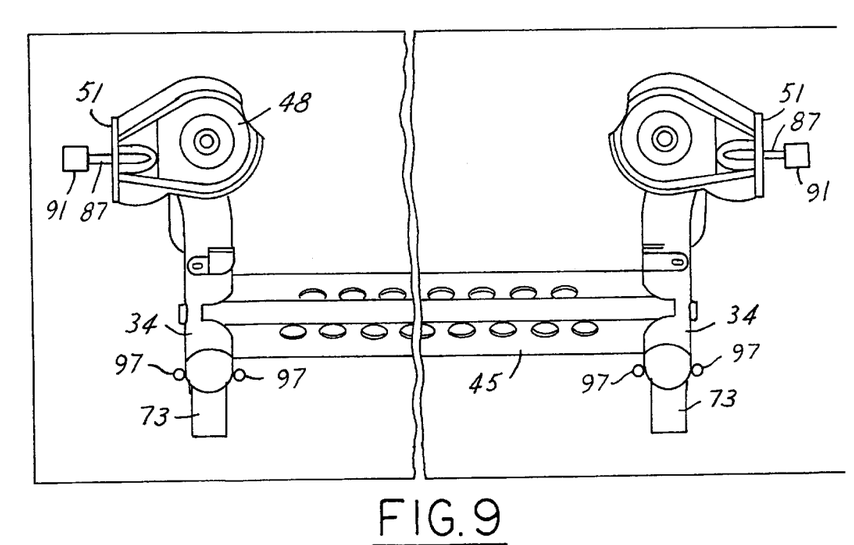
FIG. 9 is a top elevational view of the axle assembly according to the present invention shown previously in FIGS. 4–6.

Prior to placement upon tray 80 or shortly thereafter, if desired, the body bracket 70 along with the bushing 26 can be preassembled to the axle assembly 7, as best shown on the right-hand side in FIG. 8. Thereafter, the bracket assembly will have three generally vertically oriented holes which can be joined to the vehicle body 14 by a series of fasteners 101. The fasteners 101 extend into holes in the vehicle body 14 and are captured in a caged nut arrangement to allow for dimensional variations in the vehicle body stampings and components. This provides a major advantage of the invention in that the fasteners 101 are all attached in a vertical fashion. Automated assembly is facilitated. Once the fasteners 101 are passed through the holes in the bracket 70 and through the sleeves 26 and torqued to a predetermined magnitude of torque to clamp the sleeves into place, the axle assembly is mounted and the tool tray is dropped away from the axle assembly 7 and the body 14. The coil springs and other various suspension components are then attached.

A fixture (not shown) is used to determine the proper elevation and angle of the bracket 70 with respect to the trailing control arms 34. Therefore, the curb height of the vehicle body 14 can be held to a tighter tolerance. Typically, the present inventive method can allow the curb height to be 5 mm more accurate on average. The life of bushing 26 is extended by insuring a proper preload since the bracket orientation and trailing control arms orientation can be set before the axle assembly is connected with the vehicle.

Figure 1:
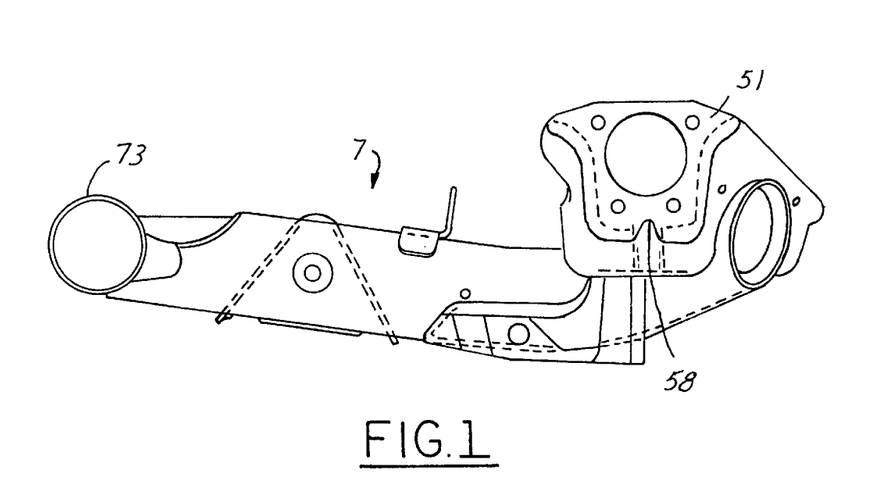
FIG. 1 is a side elevational view of an axle assembly of the present invention.
Figure 2:
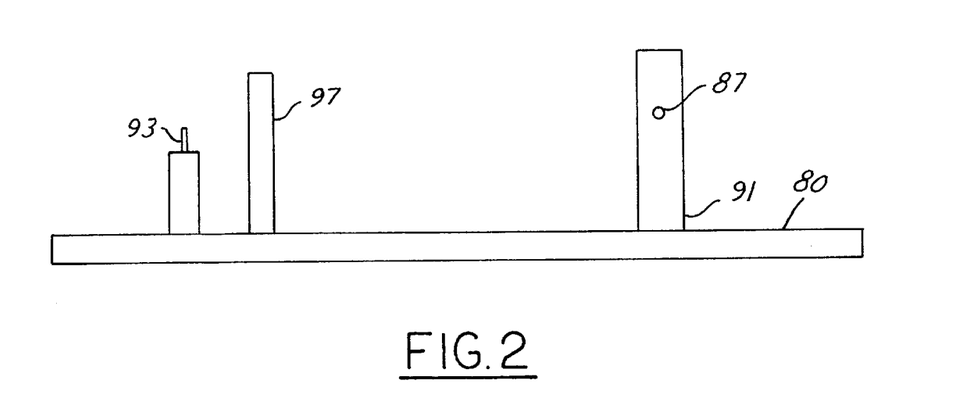
FIG. 2 is a side elevational view of a tool tray according to the present invention.
Figure 3:
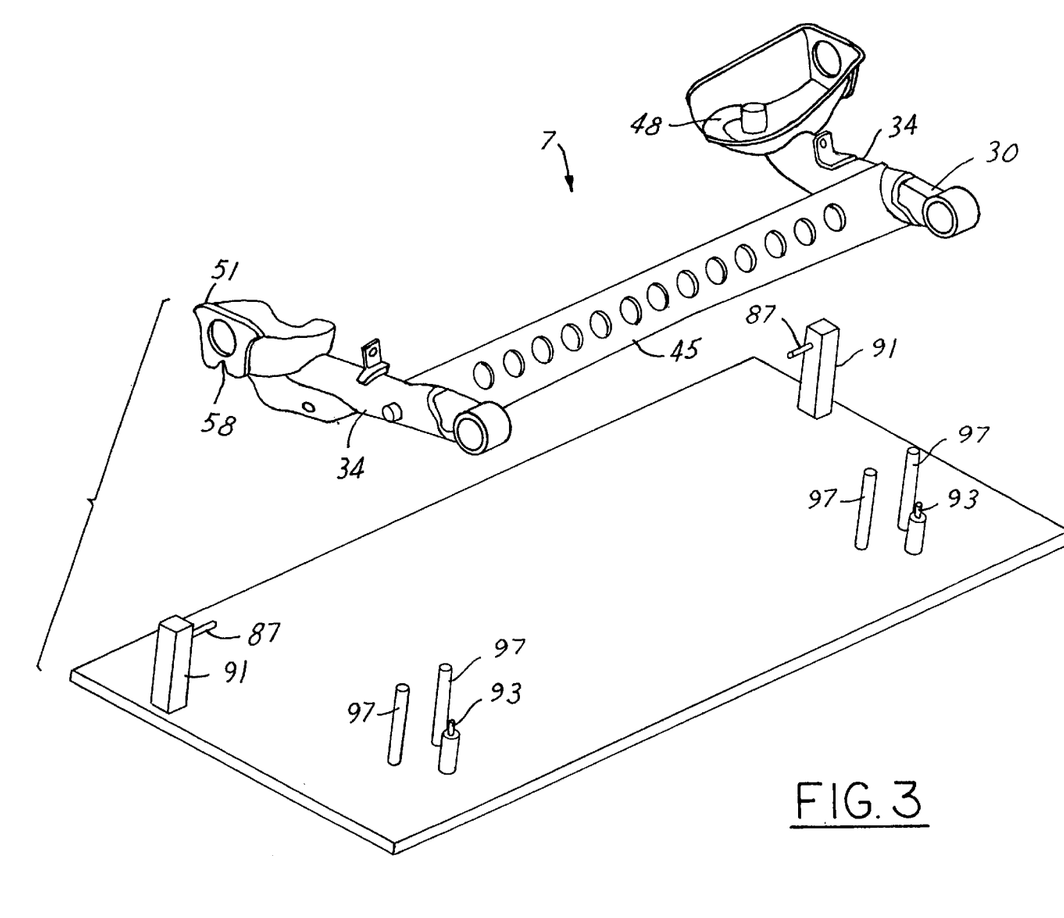
FIG. 3 is a perspective view of the axle assembly of the present invention shown being lowered down to the tool tray.
Figure 4:
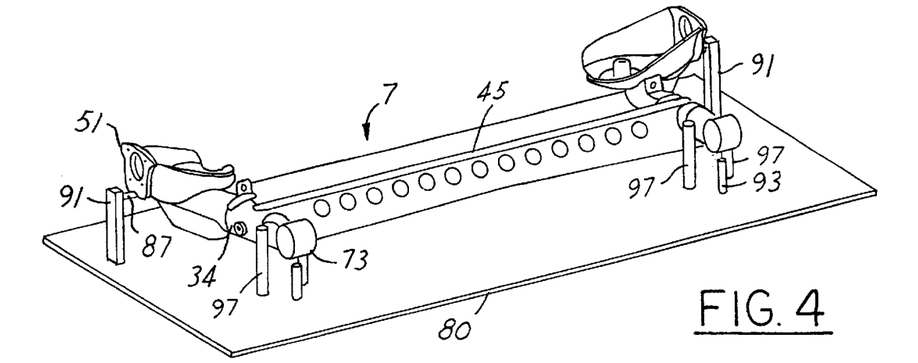
FIG. 4 is a perspective view of the axle assembly of the present invention being positioned on the inventive tool tray.
Figure 5:
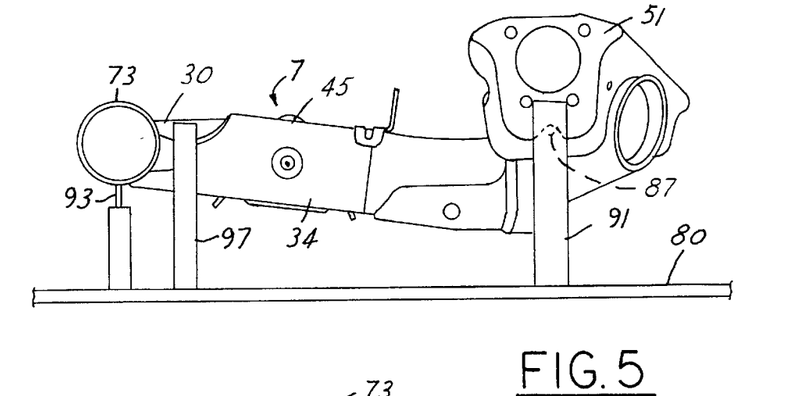
FIG. 5 is a side elevational view of the axle assembly of the present invention positioned on the inventive tool tray.
Figure 6:
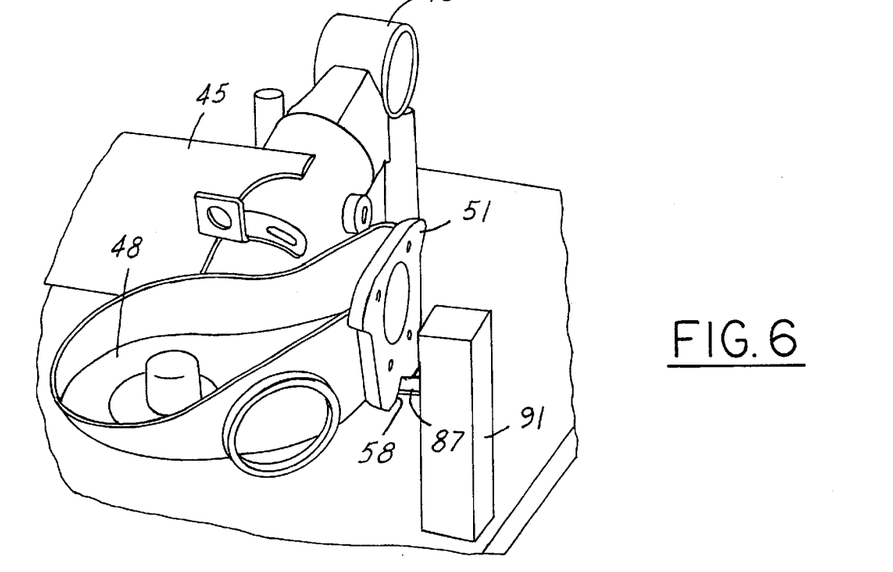
FIG. 6 is a partial exploded perspective view of the axle of the present invention positioned on the inventive tool tray.
Figure 7:
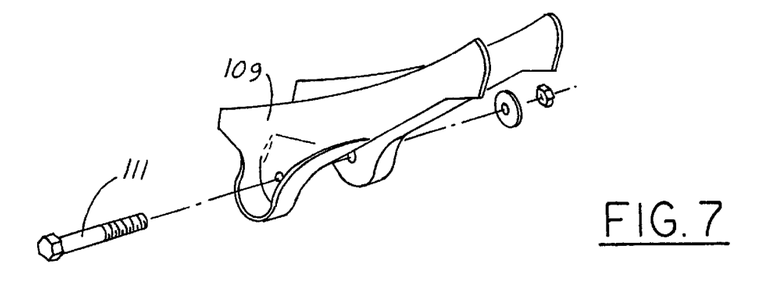
FIG. 7 is a perspective view of a bracket which is preconnected to the vehicle body which has spaced-apart ears for connection of the bushing therebetween.

In an alternative embodiment as shown in FIG. 7, the vehicle body 7 can have the brackets 70 as previously described, or a bracket 109 preattached to the vehicle body. The axle assembly is still placed on the tool tray 80 as previously described. However, a mounting bolt 111 and its associated nut and washer must be attached with the bushing cylindrical insert 40 to attach the axle assembly to the vehicle. The bolt 111 is horizontally oriented and has its nut on the other side. It has been found that this build sequence does not easily lend itself to automotive assembly as in the prior example of when the brackets 70 are preassembled to the axle assembly 7.

The present invention has been described in various embodiments. It will be readily apparent to those skilled in the art that various modifications can be made to the present invention without departing from the spirit and scope of the invention as it is defined in the following claims.

We claim:

1. A method of marrying a rear axle assembly to a motor vehicle body, said rear axle assembly having generally parallel-spaced trailing control arms connected together by a transverse twist beam, said trailing control arms having a sleeve at a forward end and a spindle plate adjacent a rear end, said spindle plate along its lower end having V-shaped notches which are vertically and fore and aft aligned with one another, said method comprising the steps of:

connecting with a tool tray, two fore and aft aligned and vertically aligned elevated first and second pins projecting toward one another;

connecting with said tray, third and fourth pins for contacting said trailing control arms to set the vertical height of said forward end of said trailing control arms;

connecting with said tray, fifth and sixth pins for aligning contact with said trailing control arms to set the lateral position of said axle assembly;

setting the axle assembly on said tray by placing said spindle plate V-shaped notches on said first and second pins to set said axle assembly fore and aft position and rear and vertical position with respect to said tray;

setting said forward end of said trailing control arms on said third and fourth pins to set the height of the front end of said trailing control arms;

contacting said trailing control arms with said fifth and sixth pins to laterally set the position of said axle assembly;

maintaining said tool tray with respect to said motor vehicle body in a fixed fore and aft position with respect to said motor vehicle body and a fixed lateral position with respect to said motor vehicle body;

lifting said tool tray up to said vehicle body; and connecting said axle to said vehicle body.

2. A method as described in claim 1 wherein said third and fourth pins contact said sleeve at said forward end of said trailing control arms.

3. A method as described in claim 2 wherein there are two pins lateral of each of said trailing control arms to laterally set the position of said trailing control arms with respect to said tray.

4. A method as described in claim 1 wherein a bracket is pre-assembled to said vehicle body and said rear axle assembly sleeves have a bushing mounted therein and said bushing is connected to said bracket.

5. A method as described in claim 1 wherein said trailing control arms sleeves have a bushing connected therein and said bushing is connected to a bracket for subsequent attachment to said vehicle body.

6. A method of marrying a rear axle assembly to a motor vehicle body, said rear axle assembly having generally parallel-spaced trailing control arms connected together by a transverse twist beam, said trailing control arms having a sleeve at a forward end and a spindle plate adjacent a rear end, said spindle plate along its lower end having V-shaped notches which are vertically and fore and aft aligned with one another, said method comprising the steps of:

connecting with a tool tray, two fore and aft aligned and vertically aligned elevated first and second pins projecting toward one another;

connecting with said tray, third and fourth pins for contacting said trailing control arm sleeves to set the vertical height of said forward end of said trailing control arms;

connecting with said tray, a pair of fifth and sixth pins for aligning contact with said trailing control arms to set the lateral position of said axle assembly;

connecting with said trailing control arm sleeves a bushing;

connecting said bushing with a bracket;

setting the axle assembly on the tray by placing said spindle plate V-shaped notches on said first and second pins to set said axle assembly fore and aft position and rear end vertical position with respect to said tray;

setting said sleeves of said trailing control arms on said third and fourth pins to set the height of said forward end of said trailing control arms;

contacting said trailing control arms with said pair of fifth and sixth pins to laterally set the position of said axle assembly;

maintaining said tool tray with respect to said motor vehicle body in a fixed fore and aft position with respect to said motor vehicle body and a fixed lateral position with respect to said motor vehicle body;

lifting said tool tray up to said vehicle body; and connecting said axle to said vehicle body by connecting said bracket with said vehicle body.

7. A method as described in claim 6 wherein said bracket is connected with said vehicle body with vertical fasteners.

* * * * *